UNITED STATES PATENT OFFICE.

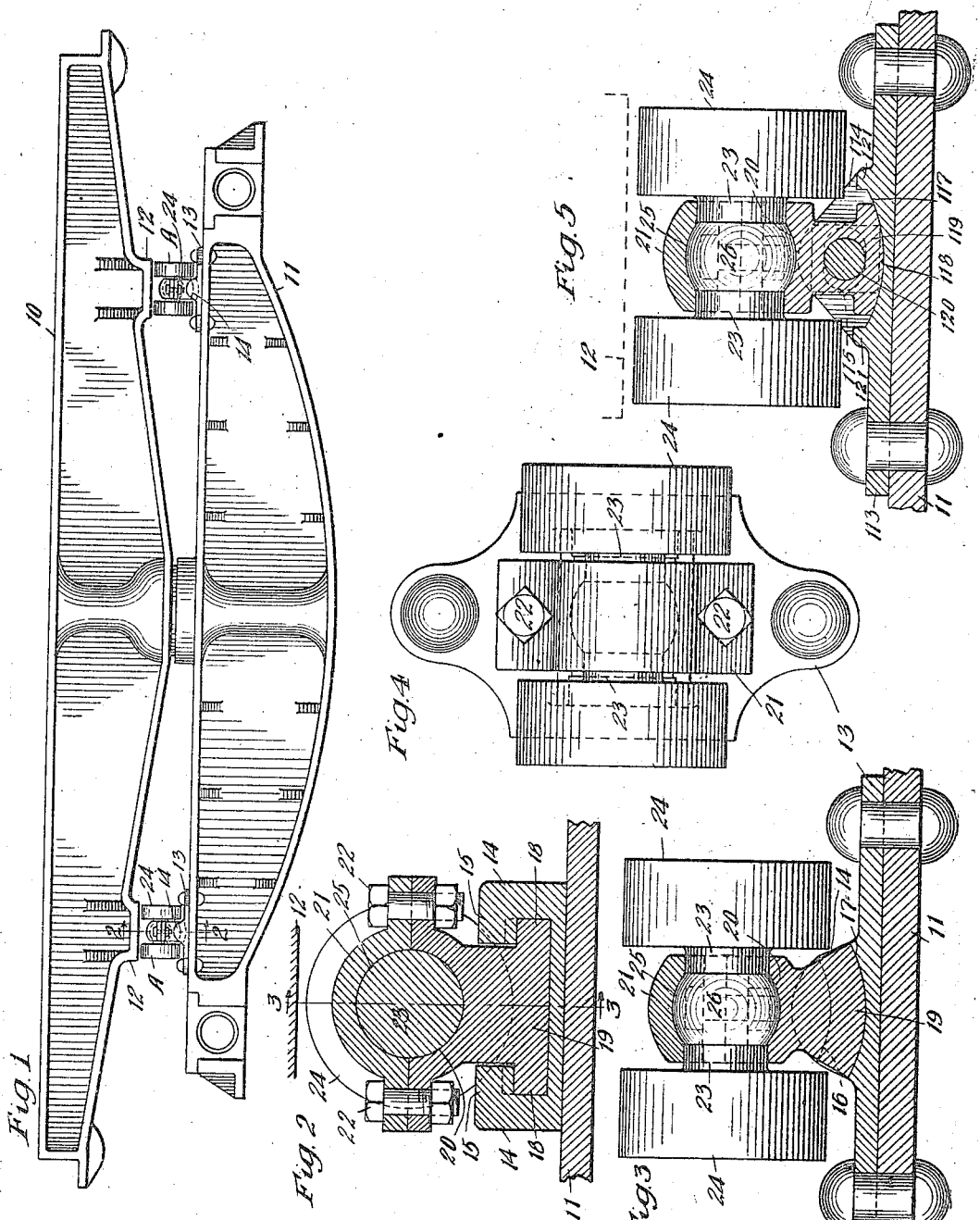

CALVIN B. PATCH, OF GLENELLYN, ILLINOIS, ASSIGNOR TO WILLIAM H. MINER, OF CHAZY, NEW YORK.

SIDE BEARING.

1,155,436.   Specification of Letters Patent.   Patented Oct. 5, 1915.

Application filed July 25, 1914. Serial No. 853,003.

*To all whom it may concern:*

Be it known that I, CALVIN B. PATCH, a citizen of the United States, residing at Glenellyn, in the county of Dupage and State of Illinois, have invented a certain new and useful Improvement in Side Bearings, of which the following is a full, clear, concise, and exact description, reference being had to the accompanying drawings, forming a part of this specification.

This invention relates to improvements in side bearings.

An object of the invention is to provide a roller side bearing of simple and relatively cheap construction and one that is efficient in operation.

In the drawing forming a part of this specification, Figure 1 is a side elevation of a car body bolster and truck bolster showing my improvements in connection therewith. Fig. 2 is an enlarged vertical sectional view taken substantially on the line 2—2 of Fig. 1. Fig. 3 is a vertical sectional view taken substantially on the line 3—3 of Fig. 2. Fig. 4 is a top plan view of the structure shown in Figs. 2 and 3, and Fig. 5 is a sectional view, similar to Fig. 3, illustrating another form of my improvements.

In said drawing 10 denotes the body bolster and 11 the truck bolster, the same being pivotally connected at the centers in the usual manner. As shown, the body bolster 10, on each side of the center thereof, is provided with an integral wear plate or thrust member 12 adapted to coöperate with the other bearing member of the side bearing A. The bearing member A, as shown, comprises a base plate 13 secured by rivets or other suitable means to the truck bolster 11, said base plate 13 having upstanding spaced lugs 14, 14 each provided with an inwardly turned flange 15 curved on the under side thereof as indicated at 16, the under side 16 coöperating with a correspondingly curved face 17 formed on the base plate 13 to make an arcuate groove to receive the correspondingly curved, outwardly extended flanges 18 formed on the bottom of a cradle 19 whereby the cradle 19 is rockably mounted on the base plate 13. The cradle 19 has formed therein half of a journal bearing 20, the other half of the bearing being formed in a cap piece 21 detachably secured to the member 19 by means of bolts and nuts 22, 22. The bearing thus formed in the cradle receives a journal 23 on the ends of which are provided antifriction rollers 24, said rollers being preferably formed integrally with the journal 23. A portion of the journal bearing is concaved as indicated at 25 and a portion of the journal 23 is enlarged at the center thereof so as to constitute a central zone of a spherical surface, as indicated at 26, to thereby provide a larger wearing surface between the journal and the journal bearing. As clearly shown in Fig. 3, there is a slight clearance between the lower inner edge of each roller 24 and the adjacent portions of the upstanding lugs 14, 14, this clearance being sufficient to permit the cradle 19 to rock and accommodate itself to the movements of the bolsters.

It will be noted that the cradle is detachably rockably connected to the base casting 13 and in assembling the parts, the cradle 19 without the rollers carried thereby is first inserted with its flanges 18 in the grooves on the inner sides of the lugs 14, 14. Thereupon the journal with its rollers is put in place and the cap piece 21 bolted on and when thus assembled, the rollers 24 will prevent accidental disengagement or separation of the cradle from the base casting. It will furthermore be noted that all the parts may be made in the form of castings, thus producing a device cheap to manufacture.

In the structure shown in Fig. 5, the base casting 113 is provided with spaced upstanding lugs 114 each of which has an elongated slot 115 therein, the base casting being also provided with curved bearing surface 117. The cradle 119 is curved at the bottom thereof as indicated at 118 to bear on the curved surface 117 whereby the cradle is adapted to rock relatively to the base casting. To hold the cradle in position, a pin 120 is provided which extends therethrough and into the elongated slots 115. The journal and the rollers carried thereby are preferably of the same construction as the corresponding parts shown in the other figures of the drawing. In the construction just described, the base casting and cradle are provided with coöperating shoulders 121, 121 to limit the amount of rocking movement of the cradle.

Although I have herein shown and described what I consider the preferable manner of carrying out my invention, yet I am aware that various changes and modifications may be made in the details of construction and arrangement of parts without departing from the spirit of the invention.

I claim:—

1. In a side bearing for railway cars, a rockably mounted cradle, a journal rotatably mounted in said cradle, and a roller carried on each end of said journal, the cradle being rockable about a pivot at right angles to the axis of said journal.

2. In a side bearing for railway cars, the combination with a base plate, of a cradle, said plate and cradle having interengaging means permitting the latter to have a rocking movement, and a journal rotatably mounted in said cradle having rollers on the ends thereof, said cradle being pivoted about an axis extending at right angles to the axis of said journal.

3. In a side bearing for railway cars, the combination with a base plate, of a cradle, said plate and cradle having interengaging means permitting the latter to have a rocking movement, said means comprising arcuate flanges on one of said members and arcuate grooves on the other member, and a roller carried by said cradle.

4. In a side bearing for railway cars, the combination with a base plate, of a cradle detachably and rockably mounted on said plate, axially alined rollers carried by said cradle on opposite sides thereof, said rollers preventing disengagement of said cradle from the base plate, said cradle being rockable about an axis at right angles to the axis of said rollers.

5. In a side bearing for railway cars, the combination with a base plate having spaced, upstanding lugs provided with arcuate grooves on the inner sides thereof, of a cradle having laterally extended arcuate flanges at the bottom thereof mounted in said grooves, and rollers carried by said cradle.

6. In a side bearing for railway cars, the combination with a base casting, of a cradle, said casting and cradle having means for detachably and rockably connecting the same, said means including arcuate shaped flanges formed on one of said members and arcuate shaped grooves formed on the other of said members, a journal rotatably mounted in said cradle, and rollers carried on the ends of said journal, said rollers preventing accidental separation of the cradle from the base plate.

CALVIN B. PATCH.

Witnesses:
CARRIE G. RANZ,
ARLINE R. ARNOLD.